Figure 1:
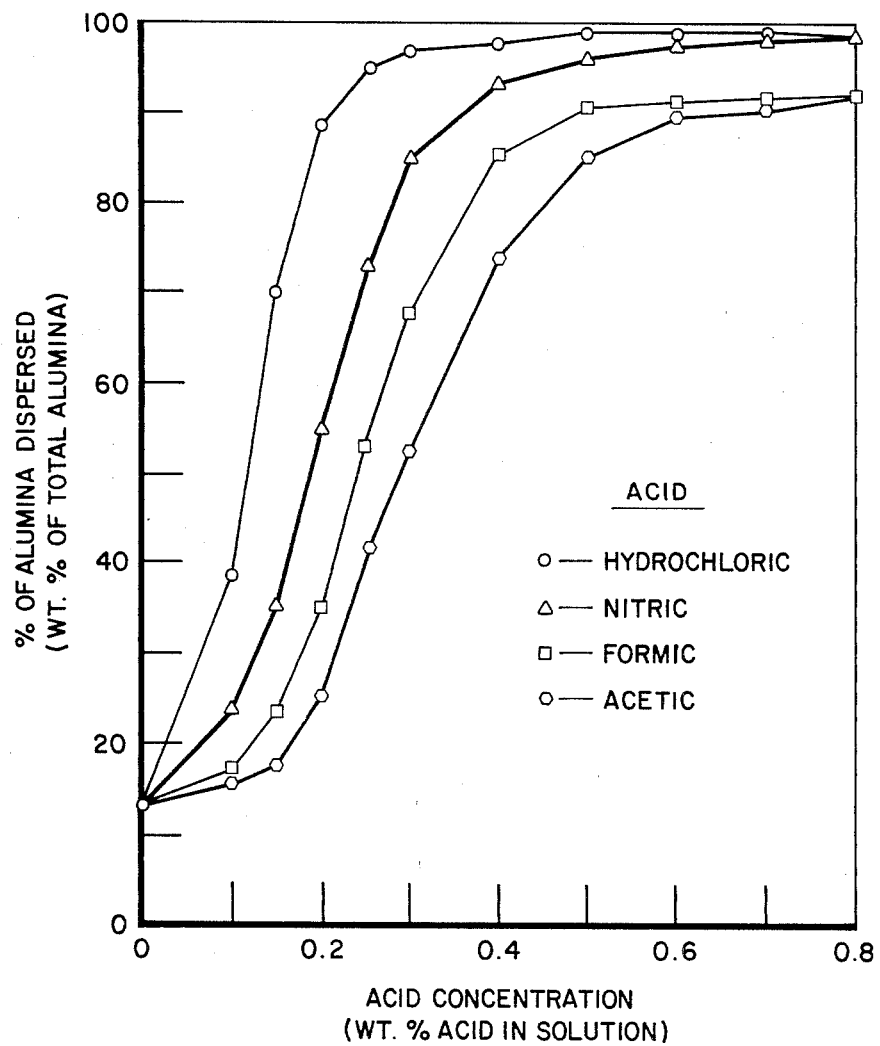

United States Patent [19]

Oberlander et al.

[11] 4,360,449
[45] Nov. 23, 1982

[54] ALUMINA DISPERSION BEHAVIOR

[75] Inventors: Richard K. Oberlander, Ponca City; Lewis B. Decker, Jr., Lake Charles, both of La.

[73] Assignee: Conoco Inc., Ponca City, Okla.

[21] Appl. No.: 292,773

[22] Filed: Aug. 14, 1981

Related U.S. Application Data

[63] Continuation-in-part of Ser. No. 72,265, Sep. 4, 1979, abandoned.

[51] Int. Cl.³ .............................................. B01J 13/00
[52] U.S. Cl. ................................ 252/313 R; 423/625; 423/628
[58] Field of Search ..................... 252/313 R; 423/625, 423/628

[56] References Cited

U.S. PATENT DOCUMENTS

| 2,656,321 | 10/1953 | Hunter et al. | 252/313 R |
| 2,903,418 | 9/1959 | Kirshenbaum et al. | 252/313 R X |
| 3,357,791 | 12/1967 | Napier | 252/313 R X |
| 3,379,499 | 4/1968 | Moehl | 423/628 |
| 3,739,062 | 6/1973 | Barsotti | 423/628 X |
| 3,879,310 | 4/1975 | Rigge et al. | 423/628 X |
| 4,117,105 | 9/1978 | Hertzenberg et al. | 423/625 |
| 4,186,178 | 1/1980 | Oberlander | 423/625 X |
| 4,191,737 | 4/1980 | Irvine | 423/625 X |
| 4,248,852 | 2/1981 | Wakabayashi et al. | 423/628 X |
| 4,313,923 | 2/1982 | Block et al. | 423/628 |

OTHER PUBLICATIONS

DuPont "Baymal" Colloidal Alumina, Brochure of E.I. Du Pont de Nemours & Co., Wilmington, Del., 1961, pp. 3, 21, 22 & FIG. 1.
Dispersions of Powders in Liquids, Edited by Parfitt, 2nd Edition, 1973, John Wiley & Sons, N.Y., pp. 2–3.

Primary Examiner—Lucille M. Phynes
Attorney, Agent, or Firm—Cortlan R. Schupbach, Jr.

[57] ABSTRACT

A method is provided for forming stable dispersions of boehmite alumina in water containing a peptizing acid by mixing said alumina with dilute aqueous acid solutions and treating the alumina prior to dispersion by heating at temperatures of from about 250° F. to 700° F. and pressures of from about 10 psig to about 2000 psig in the presence of up to 80 weight percent of water based upon the total alumina for a period of time sufficient to stabilize the alumina to the extent necessary. Dispersions can be prepared which will remain fluid up to days longer than will those prepared from the untreated alumina.

6 Claims, 1 Drawing Figure

ALUMINA DISPERSION BEHAVIOR

This is a continuation-in-part of application Ser. No. 72,265 filed Sept. 4, 1979 now abandoned.

This invention relates to a method for stabilizing alumina slurries against viscosity increases. More particularly, this invention relates to a method for increasing the fluid life of alumina slurries by heat treating alumina under pressure in the presence of water, then forming alumina slurries using the recovered alumina and normal peptizing agents.

In this application and claims, dispersion will mean the apparent uniform distribution of alumina particles throughout a dilute acidic solution. A stable dispersion will mean a dispersion in which the alumina particles remain homogenously dispersed throughout their observed lifetime without the use of agitation to keep the particles suspended and the dispersion remains fluid. A dispersion that gelled, even though the alumina particles remained homogenously distributed, would not be considered stable because gelling is a special case of flocculation. These definitions are derived from *An Introduction to Clay Colloid Chemistry*, Second Edition, H. van Olphen, pages 16–17, and 27–28, John Wiley and Sons, New York, 1977.

Aluminas are utilized commercially by placing such aluminas into dispersions or suspensions (sometimes called slurries in the art) through the use of peptizing agents such as an acid. Examples of such acids are hydrochloric acid and nitric acid. Once in a suspension or slurry state, these aluminas are commercially used and widely varying applications such as frictionizing paper surfaces, fiberglass surfaces, and metal surfaces. Alumina is also used as an antistatic and soil protection agent on wool, nylon, and acrylic carpets. Alumina is used as a dispersion agent in rug shampoos as well as an antistatic or anti-soil agent. Alumina also finds use as binders for vacuum cast alumina silica fibers, as a sintering aid, and for coating ceramic monoliths for use in auto exhaust catalysts. Usually, such dispersible aluminas are of the boehmite structure which tend to form more colloidal aqueous dispersions with dilute peptizing agents such as acids than do other aluminas such as alpha alumina trihydrates. However, unless stabilized in some fashion, many dispersions tend to very rapidly form thick gellatinous materials (or gels) and thus become unuseable for their commercial applications. It is of great importance to maintain the fluid lifetime of a prepared alumina dispersion at the desired level for as long as possible. Factors effecting the useful lifetime of these dispersions are acid concentration, type of acid employed, the type of alumina employed, and the alumina concentration.

The chemical and physical structure of the boehmite aluminas was not well understood for many years. Because "well crystallized" boehmite (also known as alpha alumina monohydrate) had been found to have the emperical formula of $Al_2O_3 \cdot H_2O$ it was believed to be a different material than psuedoboehmite alumina (also referred to as microcrystalline boehmite and gelatinous boehmite) because this latter material contained excess water in comparison to the emperical formulation B. R. Baker and R. M. Pearson have recently proposed a model in *Water Content of Psuedoboehmite: A new model for its structure*, Journal of Catalysis, 33, 1974, pages 265–278, which shows these aluminas are both of the same physical and chemical structure but differ in water content because of their relative crystallite size. While these aluminas are of the same family, the smaller crystallite psuedoboehmite (hereafter PB) aluminas are much more preferred in applications related to surface phenomena such as catalysts and adsorption applications. While dispersions of both the well crystallized and PB aluminas can be made we have found that they behave differently. The PB aluminas tend to disperse readily, are prone to gel, and do not settle. On the other hand the well crystallized aluminas tend to behave more as a suspension and tend to show different concentration zones in the dispersion, settle out, and resist gelling. We believe that well crystallized aluminas do not gel because their dispersed particle size is many times larger than the PB aluminas. X-ray diffraction shows that common PB aluminas have crystallite sizes in the 25 to 100Å range. These aluminas, when processed by the techniques of this invention exhibit crystallite sizes of 25 to 400 depending on the autoclave temperature and time. A well crystallized boehmite alumina prepared by the method described in U.S. Pat. No. 4,117,105 in comparison, was greatly in excess of 500Å.

The particles of PB aluminas as produced are agglomerations of crystallites. In order to disperse these aluminas the agglomerates must be reduced to a sufficiently small particles size that such particles stay suspended. For some PB aluminas this is readily accomplished by using a monovalent acid (HCl, acetic, formic, nitric) as a peptizing agent. Divalent and trivalent acids lead to non-dispersing flocculants. Once peptized these aluminas readily form a colloidal-like dispersion. However, even at relatively low alumina concentrations ($\sim 5\%$ PB) these dispersions may begin to thicken and will eventually gel. Because PB aluminas have a plate like crystal structure and because of the behavior of the gel, we believe that the crystallites form a face-to-edge arrangement or face-to-edge flocculated and aggregated arrangement. If the face-to-edge bonding is strong, the gels formed will solidify and be difficult to break, but if weak they will break up on agitation and the gel will return to a liquid form (thixotropic type gels). In the process of this invention we have observed that the bonding force forming the gel has been reduced.

In a dispersion the tendency for the particles to flocculate and form a gel or alternatively fall out of suspension is a function of the solids concentration, the size of the dispersed particles, and the amount and kind of peptizing agent used. With increasing solids concentration the probability of particles approaching sufficiently close to be mutually attracted and becoming agglomerates increases. For dispersions of equal concentration the probability of agglomeration increases with decreasing particle size, since more particles are present. This agglormerization process will result in either gelling or the particles settling out of suspension. It is well known that for dispersions of the same concentration that the amount of light that can be transmitted through the dispersion increases with decreasing particle size. We have determined by this technique that in dispersions of PB alumina particle size decreases with increasing levels of acid peptization and with time. We have also found that the stronger the acid used as peptizing agent, the higher the degree of peptization and the shorter the fluid life.

If the level of peptizing agent is too low, a portion of the alumina will not be sufficiently reduced in size to stay suspended and will settle. The FIGURE shows that dispersibility of the alumina increases rapidly, with increasing acid concentration, then levels off. Since increased acid levels promote gelling, it is common practice to sacrifice some alumina to sediment to achieve a longer fluid life.

In addition, small amounts of salts in the dispersion are reported to increase the thickness of boehmite alumins dispersions significantly, as set forth in *Baymal®  Colloidal Alumina,* section 2 "Physical and Chemical Behavior" DuPont Chemical Company product brochure. Addition of colloidal silica is reported to reduce the thickening of colloidal aluminas (*Alumina as a Ceramic Material,* American Chemical Society, 1970, Gitzen, page 113).

In copending Ser. No. 948,124 filed Oct. 10, 1978 now U.S. Pat. No. 4,191,737 granted Mar. 4, 1980, alumina slurries or suspensions were taught to be stabilized against viscosity increases by treating with water which had been heated to temperatures of from about 40° C. to about 100° C., then cooling, decanting the water and recovering a wet cake. Water was then added to the recovered wet cake alumina to obtain a slurry with a desired alumina content and $CO_2$ was sparged through the finished slurry.

In U.S. Pat. No. 4,186,178, alumina dispersions were taught to be stabilized against thickening and gelling by digesting the dried alumina powder in hot water for a time sufficient to stablize the alumina. The digested alumina was recovered and dispersed in water containing a small amount of peptizing agent.

Many of these prior art inventions were useful where alumina slurries are utilized and only a portion of the alumina needed to be truly dispersed, while the balance could be kept mechanically suspended by agitation. All the prior art method incur one or more undesirable limitations. For example, the treatment processes result in a wet cake which is difficult to handle. In addition, considerable amounts of water are required in the treatment process, and if carbon dioxide is used, considerable amounts of carbon dioxide are likewise necessary. The treated alumina from the prior art processes may require filtering and/or washing before being used in the preparation of the dispersion. In addition, continuous stirring may be required to keep all the alumina suspended since only a portion may be truly dispersed. Continual bubbling of $CO_2$ through the dispersion or slurry may also be needed. The instant invention, in contrast, provides a method wherein the alumina is truly dispersed and no mechanical agitation is required to keep the alumina suspended. In addition, even longer fluid life is obtained than provided by those processes of the prior art.

Thus it would be of great benefit to provide a method for obtaining a true alumina dispersion having a long suspension life before gelling.

It is therefore an object of the present invention to provide a method for making a true alumina dispersion which has a long fluid life. Other objects will become apparent to those skilled in this art as the description proceeds.

It has been discovered in accordance with the instant invention that stable dispersions of boehmite aluminas in water can be obtained by mixing alumina having a crystallite size of from 25 to 400 angstroms with dilute aqueous acid solution and treating the alumina prior to dispersion by heating to temperatures of from about 250° F. to about 700° F. and pressures of from about 10 pounds per square inch gauge (psig) to about 2000 psig in the presence of from about 10 to about 80 weight percent of water, based upon the total alumina, for a period of time sufficient to stablize the alumina to the extent necessary. The alumina must be free of sulfate and/or other impurities which cause flocculation and precipitation in dispersions. The present invention affects aluminas itself and not contaminants.

In carrying out the process of the instant invention, the time of heating can range from about 5 minutes to about 24 hours, although from about 1 hour to about 8 hours is preferred. The aluminas tested herein are derived from the hydrolysis of aluminum alkoxide, although aluminas from other sources can be used if significant levels of flocculating contaminants are not contained in the alumina and the alumina has a crystallite size of from 25 to 400 angstroms. The preferred method of carrying out the process of the instant invention is to heat the aluminas at temperatures of from about 250° F. to about 500° F. in the presence of from about 10 to about 30 weight percent water. As this heating is done in the presence of water is done in the sealed autoclave, an autogeneous pressure will result. Such a pressure is normally quite sufficient for the stabilization of the aluminas described herein. However, extra outside pressure can be added as desired. Normally, however, such pressure is not necessary.

Once recovered from the autoclave, alumina is dispersed at concentrations from 5 to 45 weight percent in an aqueous acid solution containing from about 0.4 to about 2.0% weight percent monovalent acid. These acids can be those well known in the art as represented by nitric, hydrochloric, acetic, formic, and in general, monovalent acids.

The aluminas obtained from the process of the instant invention maintain true dispersions for great lengths of time. The physical details of the structure alteration in the alumina are not known; however, without being bound by any theory, we believe that one or more properties are related to the improved fluid life.

Crystallite Size - is important, since X-ray diffraction shows that autoclaved aluminas have progressively larger crystallite size with increasing autoclave temperatures and time. In the dispersion process a significant amount of the alumina particles are peptized to individual crystallites. The larger crystallites are less prone to agglomerate and form a gel than smaller crystallites.

Chemical alterations are important, since thermogravometric analysis (TGA) indicates increasing loss of chemically bound water with increasing autoclave temperatures. This change in chemistry appears to lessen the degree of attractive forces existing between the face and edges of the crystallite particles.

Degree of peptization is important, since light transmittance measurements indicate increasing size for the dispersed particles as increasing autoclave temperatures are used. This increased size appears to be related to the autoclaved alumina not being reduced to aggregates (of crystallites) that are as small as those obtained when unautoclaved alumina is dispersed.

The instant invention is more concretely described with reference to the examples below wherein all parts and percentages are by weight unless otherwise specified. The examples are provided to illustrate the instant invention and not to limit it.

Several experiments were carried out showing the effect of autoclaving time, autoclaving temperature and water content upon the process of the instant invention. These experiments were generated using from 1000 to 1500 grams of alumina (CATAPAL 'SB', trademark of and sold by Conoco Inc.) which were placed in a 1 gallon autoclave. Distilled water was then added to the autoclave, the amount of water normally being equivalent to about 10 weight percent of the alumina. The autoclave was sealed and brought to treatment temperature. The rate of the temperature rise was about 10° F. per minute. At the desired autoclaving temperature, the affect of increasing periods of time were tested. At the end of the autoclaving period, the autoclave was allowed to cool to 225° F. At 225° F. the autoclave was vented to allow the steam to escape to prevent the alumina from picking up moisture and becoming a wet cake. After cooling to room temperature, the alumina was removed from the autoclave as a dry, flowable powder.

The dispersions tested in the following examples were prepared by first measuring the autoclave alumina for water content. Normally the water content was from 22.5 to 25 weight percent, the latter being typical for CATAPAL 'SB' alumina as manufactured). If the water content was outside the range, the formula concentration was adjusted so that all dispersions would be made on the same basis (each dispersion made at a given concentration would contain the same amount of $Al_2O_3$). A dispersing solution having the desired acid concentration was measured by volume and the alumina was poured into the acid solution. During this addition, the alumina was continuously stirred with a low shear mixer. Mixing was continued for 24 hours after alumina was added to the solution. Viscosity and pH were measured at the end of the mixing period. All dispersions were checked visually every day to see if such dispersions were still fluid. At the end of 30 days the amount of alumina actually dispersed was determined by decanting the dispersion from the sediment of the alumina which had settled to the bottom of the container. This determination could not be made for dispersions that had gelled.

Samples of precursor (unautoclaved) and autoclaved alumina were examined by X-ray diffraction (XRD), thermal gravimetric analysis (TGA), and light transmittance (LT) to determine what chemical and physical changes had occurred to the alumina.

Example 1 shows the effect of autoclaving time upon the process of the instant invention.

EXAMPLE 1

Samples of boehmite alumina (CATAPAL 'SB') were autoclaved at 250° F. for varying periods of time. The autoclave charge consisted of alumina and distilled water equal to 10% of the weight of alumina. After autoclaving, the alumina was dispersed at 42 weight percent concentration level in 1.4 weight percent nitric acid solution. Table 1 contains a summary of the test results.

TABLE 1

| Autoclave Time (hrs.) | 0 | 2 | 6 | 24 |
|---|---|---|---|---|
| Dispersion Data | | | | |
| 1 hr. | | | | |
| pH | — | 4.0 | 4.1 | 3.0 |
| viscosity (cps) | gel | 1102 | 10.60 | 55 |
| 3 hrs. | | | | |
| pH | — | — | 4.2 | 3.5 |
| viscosity (cps) | — | gel | 8200 | 120 |

Viscosity measurements were made using a Brookfield viscometer. The data indicates that at constant temperature the increasing autoclave time increases dispersion stability.

The effect of the amount of water used was tested in Example 2.

EXAMPLE 2

Samples of CATAPAL alumina were autoclaved as described in Example 1 except the ratio of water to alumina was varied. Test dispersions were made from the autoclave treated alumina. Test results showed that increasing the amount of water improved the dispersion stability of the alumina. However, the treated alumina resulting from higher water contents (above 30% water) appeared lumpy and clay-like. This consistency made subsequent handling of the treated alumina more difficult although dispersions showed improved stability over the untreated precursor alumina.

TABLE 2

| Water (as wt % of alumina) | 10 | 20 | 40 | 80 |
|---|---|---|---|---|
| Dispersion Data: | | | | |
| 1 hr. | | | | |
| pH | 4.0 | 3.8 | 3.9 | 3.9 |
| Viscosity (cps) | 1102 | 800 | 20 | 25 |
| 3 hr. | | | | |
| pH | — | 3.8 | 4.1 | 4.0 |
| Viscosity (cps) | gel | 2200 | 25 | 25 |

The effect of autoclaving temperature is set forth in Example 3.

EXAMPLE 3

Experimental runs were carried out as set forth in the previous examples except that all runs were made for 3 hours and the temperature was varied over the range of 250° to 500° F. using 10 weight percent water. Test dispersions of the treated alumina were dispersed in acid solution. Results of the test are set forth in Table 3.

TABLE 3

| Temperature of Run (°F.) | 250 | 300 | 350 | 400 | 450 | 500 |
|---|---|---|---|---|---|---|
| Dispersion Data: | | | | | | |
| 1 hr. | | | | | | |
| pH | 4.0 | 3.0 | 2.1 | 1.7 | 1.5 | 1.3 |
| Viscosity (cps) | 180 | 78 | 65 | 168 | gel | gel |
| 3 hr. | | | | | | |
| pH | 4.1 | 3.1 | 2.1 | 1.7[1] | | |
| Viscosity (cps) | 532 | 212 | 65 | 3140 | | |

[1]After 25 Hrs.

The data of Example 3 shows that increasing autoclave temperature improved dispersion stability up to a point. However, once that point is reached, it appears that dispersions ability is detrimentally effected. All dispersions carried out have shown that there is an optimum acid level which will result in nearly all alumina being dispersed and remaining dispersed for some period of time. At the concentration levels tested (42 percent alumina) it has been found that when the acid level is below the optimum, less alumina will be dispersed (more will settle out). If the acid level is increased above optimum, fluid life of the dispersion decreases.

Samples of the aluminas autoclaved at 450° and 500° F. were dispersed in acid solutions of various concentrations. In all dispersions tested, the amount of nondispersed alumina was very small (about 5% of the alumina) but was noted to be getting larger at the lowest acid concentrated tested.

It was observed that alumina autoclaved in the above experiments did not appear to be receiving uniform heat treatment. This was observed since alumina samples from the same autoclave experiment have different dispersion behaviors unless the alumina was uniformly blended before dispersion testing.

Cause of this non-uniformity was believed to be due to the inherent poor heat transfer of alumina powder, allowing some alumina to receive more heat treatment than alumina at other positions of the autoclave. Therefore, a new agitator was designed so that the powder would receive more mixing action during autoclaving. After installation of the agitator, the material received a more uniform heat treatment.

EXAMPLE 4

After the improved agitation was installed, additional autoclave runs and dispersions were made. Autoclave temperatures of 250° and 300° F. and dispersion concentrations of 10 to 30 weight percent alumina were tested. Tests were carried out as described in Example 1. The samples were observed daily for 30 days, viscosity being measured every 7 days.

These tests showed that for given acid concentrations, the amount of alumina that will disperse is enhanced by increasing autoclave treatment temperatures. The data also showed the fluid life of the dispersions is greatly improved by autoclave treatment, particularly for higher alumina concentrations (30% and higher). Finally, the data showed the dispersions made from autoclave treated alumina which gelled were thixotropic; that is, with the application of shear, they again became fluid. This is in distinct contrast to typical boehmite aluminas which have formed gels which remain in such a state even with agitation. The results of these experiments showing non-autoclaved alumina, autoclaved for 3 hours at 250° F., and alumina autoclaved 3 hours at 300° F. are shown in Tables 4, 5, and 6, respectively.

TABLE 4

| | Not Autoclaved | | | |
|---|---|---|---|---|
| Alumina Treatment | Nitric Acid Concentration | Percent of Alumina Dispersed | Concentration of Final Dispersion (%) | Viscosity after 30 days (cps) |
| A. 10% Alumina in Acid Solution Mixture | 0.2 | 60 | 6.0 | |
| | 0.4 | 93 | 9.3 | |
| | 0.6 | 98 | 9.8 | — |
| | 0.8 | 96 | 9.6 | 520 |
| B. 15% Alumina in Acid Solution Mixture | 0.2 | 23 | 3.5 | — |
| | 0.4 | 82 | 12.4 | — |
| | 0.6 | 93 | 13.9 | — |
| | 0.8 | 96 | 14.5 | — |
| C. 20% Alumina in Acid Solution Mixture | 0.2 | 16 | 3.2 | — |
| | 0.4 | 42 | 8.4 | — |
| | 0.6 | 85 | 19.0 | 10,000 |
| | 0.8 | 93 | 18.6 | — |
| | 1.0 | 93 | 18.7 | 410 |
| D. 30% Alumina in Acid Solution Mixture | 0.6 | (5) | — | gel |
| | 0.8 | (5) | — | gel |
| | 1.0 | (5) | — | gel |
| | 1.2 | (5) | — | gel |
| | 1.4 | (5) | — | gel |

TABLE 5

| | Autoclaved 3 Hours at 250° F. | | | |
|---|---|---|---|---|
| Alumina Treatment | Nitric Acid Concentration (Wt %) | Percent of Alumina Dispersed | Concentration of Final Dispersion (%) | Viscosity after 30 days (cps) |
| A. 10% Alumina in Acid Solution Mixture | 0.2 | 73.7 | 7.3 | — |
| | 0.4 | 98 | 9.8 | — |
| | 0.6 | 98 | 9.8 | — |
| | 0.8 | | | |
| B. 15% Alumina in Acid Solution Mixture | 0.2 | 89 | 13.4 | — |
| | 0.4 | 97 | 14.6 | — |
| | 0.6 | 98 | 14.6 | 75 |
| | 0.8 | | | |
| C. 20% Alumina in Acid Solution Mixture | 0.2 | 66 | 13.2 | — |
| | 0.4 | 95 | 18.9 | — |
| | 0.6 | 98 | 19.6 | — |
| | 0.8 | 100 | 20 | >10,000* |
| D. 30% Alumina in Acid Solution Mixture | 0.6 | 72 | 21.6 | 930 |
| | 0.8 | 93 | 27.9 | 250 |
| | 1.0 | | | 10,000+* |
| | 1.2 | | | gel (<1 day)* |
| | 1.4 | | | |

*Thixotropic

TABLE 6

Autoclaved 3 Hours at 300° F.

| Alumina Treatment | Nitric Acid Concentration (Wt %) | Percent of Alumina Dispersed | Concentration of Final Dispersion (%) | Viscosity after 30 days (cps) |
|---|---|---|---|---|
| A. 10% Alumina in Acid Solution Mixture | | | | |
| | 0.2 | 89 | 8.9 | — |
| | 0.4 | 99 | 9.9 | — |
| | 0.6 | 97 | 9.7 | — |
| | 0.8 | | | |
| B. 15% Alumina in Acid Solution Mixture | | | | |
| | 0.2 | 96 | 14.4 | — |
| | 0.4 | 99 | 14.9 | — |
| | 0.6 | 99 | 14.9 | 75 |
| C. 20% Alumina in Acid Solution Mixture | | | | |
| | 0.2 | | | |
| | 0.4 | 89 | 17.7 | — |
| | 0.6 | 97 | 19.4 | — |
| | 0.8 | 99 | 19.9 | 375* |
| | 1.0 | 100 | 20.0 | 10,000+* |
| D. 30% Alumina in Acid Solution Mixture | | | | |
| | 0.6 | | | |
| | 0.8 | 93 | 28 | — |
| | 1.0 | 98 | 29.5 | 10,000+* |
| | 1.2 | | | gel (2 days)* |
| | 1.4 | — | — | gel (1½ hrs)* |

*Thixotropic

In these tables the percent of alumina dispersed is that alumina in the dispersion which did not settle out. Concentration of final dispersion is that alumina in the final dispersion after setting unstirred for 30 days. A dash in the viscosity column indicates that the viscosity was below measurable limit, that is, water thin. In Table 4 some samples gelled in less than 1 day when 30% alumina was used and the amount of alumina dispersed could not be determined. In Tables 5 and 6, those numbers marked with an asterisk indicate thixotropic dispersions.

EXAMPLE 5

Samples of alumina were autoclaved at varying temperatures using the procedure described in example 3. These samples and the precursor were examined by TGA, X-Ray diffraction and light transmittance through attempted 10 wt% dispersions. Table 7 clearly shows that as autoclaving temperatures are increased, chemically bound water is lost, both the crystallite and dispersed particle sizes are increased and the dispersibility of the alumina is increased.

TABLE 7

| Autoclave[1] Temperature (°F.) | XRD Crystallite Size (Å) Reflection 020 | XRD Crystallite Size (Å) Reflection 021 | TGA Chemically Bound H2O Removed (Wt %) | Dispersibility[2] (wt % Al2O3) | Light Transmittance[3] (% of Total Light) |
|---|---|---|---|---|---|
| Precursor | 32 | 46 | 0 | 77 | 87 |
| 250 | 51 | 91 | 2.4 | 95 | 81 |
| 300 | 51 | 102 | 2.9 | 93 | 23 |
| 350 | 74 | 117 | 3.8 | 94 | 23 |
| 400 | 116 | 205 | 4.1 | 85 | 4 |

[1]All autoclave runs were 3 hours at temperature
[2]Alumina was added to 0.4 wt % HNO3 to make a 10 wt % mixture. The mixture was then stirred and centrifuged. The amount of alumina that settled out was determined and the % dispersed calculated as;
DISPERSIBILITY (wt %) =
$100 \times \frac{\text{wt. of alumina added} - \text{wt. alumina settled}}{\text{wt. of alumina added}}$
[3]Light transmittance through the dispersions were measured with a Bausch & Lomb model Spectronic 88 Spectrophotometer, wavelength 800 nanometers.

EXAMPLE 6

Samples of alumina were autoclaved at varying temperatures using the procedures described in Example 3. A 10 wt% alumina dispersion of these samples and unautoclaved precursors in 0.5 wt% nitric acid solution were made and examined by light transmittance over a 3 day period. Table 8 shows that light transmittance and hence degree of peptization increases with time, meaning that the dispersed particle size also decreases with time.

TABLE 8

| Autoclave Temperature (°F.)[1] | Precursor | 250 | 300 | 350 | 400 |
|---|---|---|---|---|---|
| Alumina Dispersed (wt %)[2] | 91.3 | 96.9 | 94.9 | 95.9 | 87.8 |
| Light Transmittance (% of Total)[3] At Time | | | | | |
| 3 minutes | 82.0 | 60.5 | 46.0 | 10.0 | 0.2 |
| 1 hour | 84.2 | 69.7 | 54.5 | 15.5 | 0.5 |
| 2 hour | 85.5 | 72.2 | 60.5 | 18.2 | 0.8 |
| 3 hour | 86.2 | 75.0 | 64.2 | 21.0 | 1.0 |
| 4 hour | 86.9 | 76.0 | 65.7 | 22.2 | 1.2 |
| 5 hour | 87.5 | 76.5 | 67.2 | 23.5 | 1.6 |
| 6 hour | 87.8 | 77.3 | 68.5 | 24.0 | 1.9 |

TABLE 8-continued

| Autoclave Temperature (°F.)[1] | Precursor | 250 | 300 | 350 | 400 |
|---|---|---|---|---|---|
| 7 hours | 88.2 | 77.8 | 68.5 | 25.2 | 2.0 |
| 24 hours | 89.3 | 80.1 | 74.2 | 31.1 | 4.0 |
| 48 hours | 90.2 | 81.0 | 75.1 | 34.1 | 5.2 |
| 72 hours | 91.0 | 81.2 | 76.0 | 36.4 | 6.0 |

[1] All autoclave runs 3 hours temperature
[2] Alumina was added to 0.5 wt % HNO$_3$ to make a 10 wt % mixture. The mixture was stirred and then centrifuged. The amount of alumina that settled out was determined and the % dispersed calculated as:

Dispersibility (wt %) = $100 \times \frac{\text{wt. of alumina added} - \text{wt. of alumina settle}}{\text{wt. of alumina added}}$

[3] Light transmittance through the dispersions were measured with a Bausch & Lomb, Model Spectronic 88, spectrophotometer. Wavelength 800 nanometers.

Thus the instant invention provides a vastly improved method for stabilizing alumina dispersions for greatly increased lengths of time while allowing the alumina to be easily handled, constant attention is not required except in the case of thixotropic dispersions which can be easily converted to fluid dispersions under agitation. The alumina obtained is in the form of a dry powder, is easily handled, the pre-treatment is simple and does not require exotic equipment.

While certain embodiments and details have been shown for the purpose of illustrating this invention, it will be apparent to those skilled in this art that various changes and modifications may be made herein without departing from the spirit or scope of the invention.

We claim:

1. An improved method for forming gel-resistant suspensions of alumina in water by mixing said alumina with dilute aqueous acid solutions, the improvement comprising treating PB alumina having a crystallite size of from 25 to 400 angstroms in a sealed autoclave prior to forming the suspension by heating said alumina to temperatures of from about 250° F. to about 700° F. in the presence of from about 10 to about 80% water based upon the weight of total alumina present and allowing the autoclave to achieve autogenous pressure for a time ranging from about 5 minutes to about 24 hours, then relieving pressure at a rate sufficient to dry said alumina and recovering said dry alumina.

2. A method as described in claim 1 wherein the pressure ranges from about 10 psig to about 2,000 psig.

3. A method as described in claim 2 wherein the alumina is heated at temperatures of from about 250° F. to about 500° F. in the presence of about 10 to about 30 weight percent water.

4. A method as described in claim 3 wherein the alumina is dispersed in an aqueous acid solution containing from about 0.4 to about 2.0% monovalent acid by weight based upon the total dispersion weight.

5. A method as described in claim 4 wherein the acid is selected from the group consisting of nitric, hydrochloric, acetic, formic.

6. A stable alumina dispersion obtained from the process of claim 1.

* * * * *